US012694812B1

(12) United States Patent
Kwitek et al.

(10) Patent No.: US 12,694,812 B1
(45) Date of Patent: Jul. 28, 2026

(54) AUTOMOBILE DISPLAY MUTE

(71) Applicants: Benjamin J Kwitek, Colorado Springs, CO (US); Scott C Harris, San Diego, CA (US)

(72) Inventors: Benjamin J Kwitek, Colorado Springs, CO (US); Scott C Harris, San Diego, CA (US)

( * ) Notice: Subject to any disclaimer, the term of this patent is extended or adjusted under 35 U.S.C. 154(b) by 0 days.

(21) Appl. No.: 19/299,969

(22) Filed: Aug. 14, 2025

(51) Int. Cl.
*G09G 3/20* (2006.01)

(52) U.S. Cl.
CPC ... *G09G 3/2003* (2013.01); *G09G 2320/0242* (2013.01); *G09G 2320/0666* (2013.01); *G09G 2320/0686* (2013.01); *G09G 2354/00* (2013.01); *G09G 2360/144* (2013.01); *G09G 2380/10* (2013.01)

(58) Field of Classification Search
CPC ............... G09G 2320/0242; G09G 2320/0686
USPC ......................................................... 345/586
See application file for complete search history.

(56) References Cited

U.S. PATENT DOCUMENTS

| | | | | |
|---|---|---|---|---|
| 2019/0299784 | A1* | 10/2019 | Nakano | B60K 35/23 |
| 2022/0230576 | A1* | 7/2022 | Swierk | G06F 3/013 |
| 2024/0221244 | A1* | 7/2024 | Jang | G06T 11/001 |
| 2025/0095604 | A1* | 3/2025 | Arencibia | G09G 3/003 |
| 2025/0335983 | A1* | 10/2025 | Sureka | G06V 30/19093 |

* cited by examiner

*Primary Examiner* — Samantha (Yuehan) Wang
(74) *Attorney, Agent, or Firm* — Scott C Harris, Esq

(57) ABSTRACT

A vehicle display system for use in a vehicle that has an internal vehicle compartment. A vehicle screen, in the internal vehicle compartment, driven by the processor to display information on the vehicle screen. The amount of light in the compartment is sensed, and a darkness score is formed that depends on both the amount of light in the vehicle compartment and an amount of time that the light has been at a current level in the vehicle compartment. If the amount of light is less than a specified amount, one portion of a displayed information on the screen is muted without muting another portion.

19 Claims, 2 Drawing Sheets

AUTOMOBILE DISPLAY MUTE

BACKGROUND

Modern vehicles, automobiles, sport utility vehicles, vans, trucks, motorcycles, buses and other vehicles used to transport people, have at least one display screen in the driver area, or "cockpit". Many vehicles have multiple displays that have replaced traditional gauges, buttons, and other control panels.

The display screen or screens often display specific information in certain parts of the display. For example, the left side of the display behind the steering wheel can show speed, while other parts of the display can show other things, such as temperature information and climate control features. That larger screen often highlights entertainment options-such as music stations, Internet sites, apps, and/or channels.

The graphics displayed for the entertainment screen is typically derived from the content producer. So, when a Taylor Swift song is playing, the album cover may be shown on the screen.

In low-light conditions, the brightness of the screen is often reduced automatically. In this way, the driver is not distracted with too much light coming from the inside of the vehicle.

SUMMARY OF THE INVENTION

A problem noted by the inventors is that the artistic features of these cover images were not designed for automobile displays.

One particular problem mainly occurs at night or in other low ambient light conditions. In order to make the display less intrusive, vehicles dim the entire screen brightness, usually when the vehicle detects darkness or when the headlights of the vehicle are turned on. This can prevent the driver from being distracted with too much interior light while driving the vehicle. The driver's attention needs to be on the exterior conditions-including traffic, road patterns, weather and other factors.

However, the inventors recognize that dynamic displayed content-like album cover artwork, may not be properly dimmed in this way.

Therefore, there is a real need for an improved and intelligent display system.

The present invention provides for the methods and systems to selectively adjust screen brightness of different portions of displays in a vehicle. These adjustments can also be just a portion of a display that produces too much light.

BRIEF DESCRIPTION OF THE DRAWINGS

In the Drawings.

the figures shows aspects of the invention, and specifically.

DETAILED DESCRIPTION

The present application describes a vehicle that includes a computer based routine that determines portions of content to be displayed that may create brightness issues more serious than those created by the remainder of the displayed content. The portions of the screen that are determined to be overly bright are then reduced in brightness using an adaptive technique, without reducing brightness of the other portions of the screen other than the portion that was determined to be overly bright.

Case in point: A driver is on a dark two-lane road. The driver has the vehicle lights on, and the interior illumination on the screen has been auto-dimmed. When the dynamic entertainment content changes, a largely black cover image for a rock band song is replaced with a white cover image having many different bright spots in colors. This newly displayed image cause significantly more light to emanate from the display into the cockpit-potentially distracting or momentarily blinding the driver in the context of a dark environment (outside and inside the vehicle).

While the driver could go into the vehicle's settings and reduce the brightness of the entire screen, this is a lot to ask of the driver-especially while driving. Furthermore, this adjustment might cause other data and information to become illegible due to insufficient lighting. For example, making the white album cover the desired light level might cause the speedometer data to become unviewable.

According to the present application, a system is used which determines the user's own specific details relating the user's eye sensitivity at different levels of darkness.

Color perception and brightness detection can vary from person to person. Some people will find brightnesses bothersome that others will not even notice. In general, however, certain colors can be more bothersome to the eyes than others in low light and dark conditions. This sensitivity also depends on how long the user's eyes have been in the darkness. In general, colors with shorter wavelengths, such as blues, can be more bothersome to the eye than those with longer wavelengths, such as reds. This is partly because the user's eyes, and specifically the rods in the eyes which are used for low light vision, are less sensitive to red light. Because the user's rods do not include a lot of color sensitivity, low light color perception typically does not include a color component.

In an embodiment, displayed information, e.g., an image, on a vehicle screen is adaptively dimmed based on ambient light in the vehicle, the amount of time that the light has been at the current level, and the user's specific sensitivity to light. As described herein, the dimming can be carried out by only finding only a section of the screen which has a high brightness, and reducing the effect of that brightness on a user's eye. The dimming is also carried out in a way that is responsive to the specific darkness profile for the vehicle and user.

Figure 1:
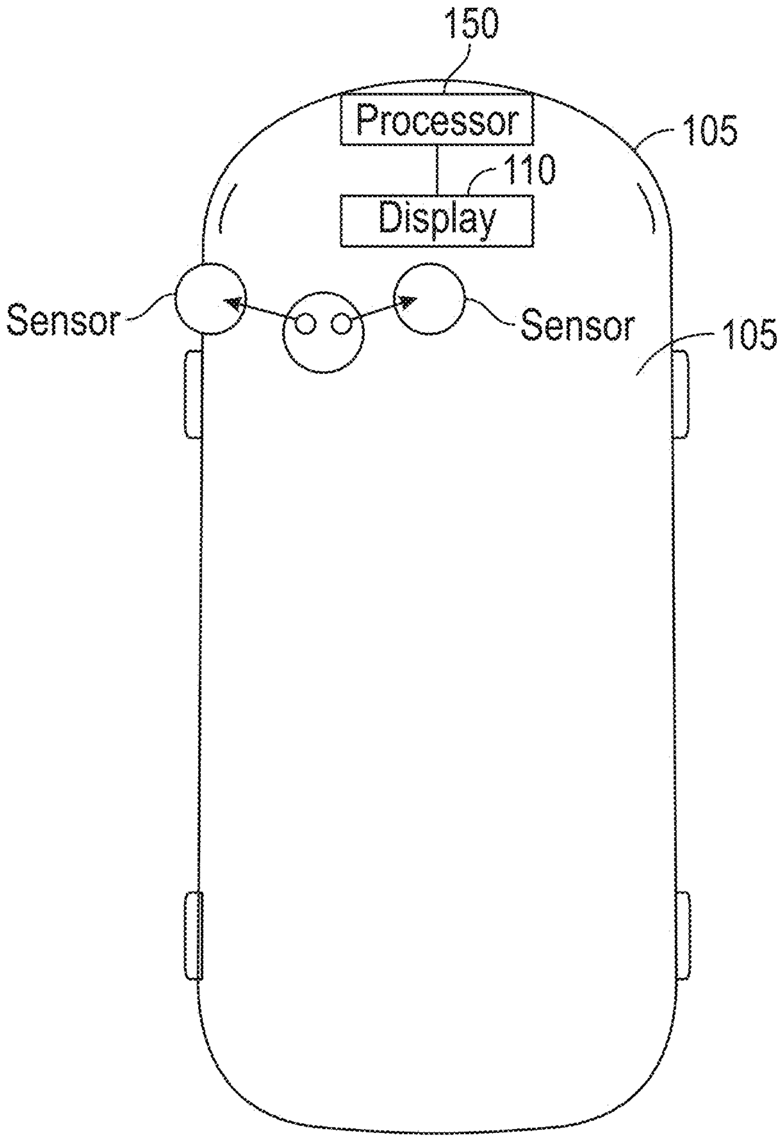
FIG. 1 shows a block diagram of a vehicle inside cabin.

An embodiment is shown in FIG. 1. The embodiment shows a vehicle 100, having an internal cab area 105 with a display device 110 that displays information to the user. The vehicle also has one or more cameras or brightness sensors 120, 121 that image, or determine the brightness of, the internal cab area 105. In an embodiment, the sensors are located in a place that receives sampling of the light similar to a sampling of the light received by the user's eyes. For example, a sensor may be located on the driver side door area, facing in a direction similar to the way that the user's eyes are facing to receive the kind of light that the eyes would receive. This is done in recognition of the fact that darkness sensors often may sense the amount of light that is inside the cabin but not at the area of the user's eye. Present embodiments may locate one or more sensors at a level of the user's eye to receive a similar amount of light to the user's eye.

Figure 2:
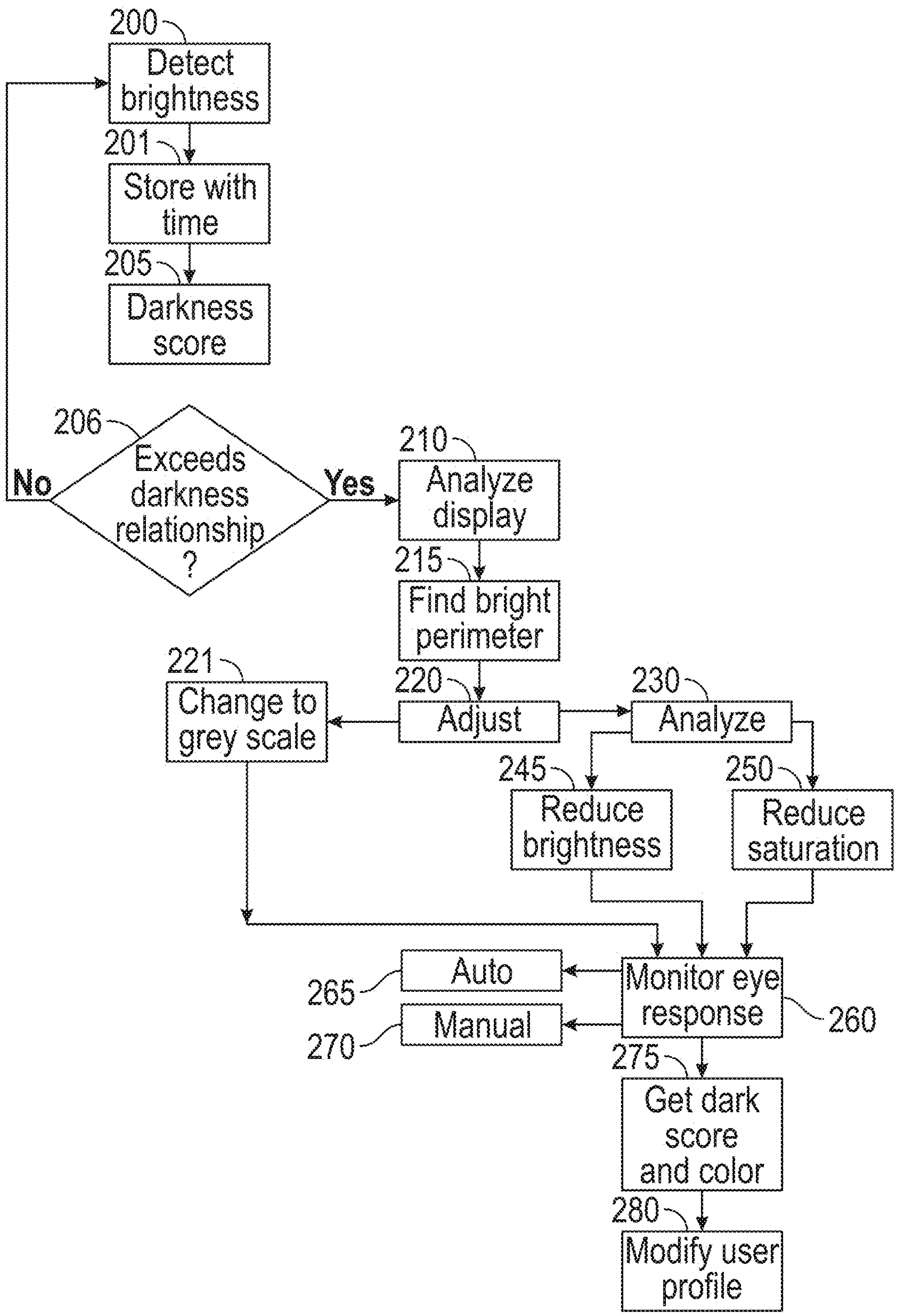
FIG. 2 shows flowchart of operation carried out by a vehicle processor to adapt a screen brightness.

The operation to adaptively dim is carried out according to the flowchart of FIG. 2.

The adaptive dimming only needs to be carried out when there is darkness in the vehicle cabin 100. Accordingly, at 200, the system uses one or more brightness sensors 120, 121 that are within the vehicle cabin 105 to determine an amount of darkness in the cabin 105. An amount of time that the cabin has been dark is determined at 201 and stored.

The darkness, and amount of time it has been dark is used to form a darkness score at 205. For example, if it is dark but has only been dark for 1 or 2 minutes, the user's eyes may not have yet fully adapted to this darkness, and brightness on the screen is not as important.

A "darkness relationship" at 206 may be empirically determined for each vehicle and user. This darkness relationship represents a relationship between an amount of darkness and a time, after which the user is sensitive to excess brightness from the display screen.

If the darkness score exceeds the darkness relationship's indication that the amount of current darkness and time is enough to cause possible user brightness discomfort, then a displayed portion of the image on the screen is analyzed at 210. This displayed portion is likely to be a displayed image or video that has been received from another, like an album cover or some other display.

The brightness detection carried out at 210 depends on the darkness relationship, as described herein.

In an embodiment, a model user profile that fits a majority of people may be used initially as the darkness relationship, and the model user profile may be adapted the system to the specifics of the user as those are discovered and used.

Part of the analysis finds a perimeter of the brightness portion at 215. This perimeter defines the edges of displayed element on the screen that has one or more aspects or colors that may be considered brighter than others.

At 220, an adjustment to the part of the image inside the perimeter is carried out.

The adjustment can use one or more of the following features to make the brightness portion of the image less bothersome to the user's eyes.

At 221 colors in the area of the image inside the perimeter can be changed dynamically to a grayscale. In a certain amount of darkness, this can make sense since the user cannot generally see colors in extreme dark conditions anyway.

At 230, the darkness relationship, which again is a user profile for the brightness for the current darkness profile including brightness and time for color versus the eye sensitivity curve is consulted. This is used to rate the image inside the perimeter according to levels, for example maximum of 5, minimum of zero.

If the analysis shows that this color and brightness is too great, one or more of the brightness of the color is reduced at 245, or the saturation of the color is reduced at 250, or both. The system then continues to display at the reduced color brightness or saturation.

The system monitors the user eye response at 260. This can be an automated technique at 265 of monitoring the user's eye response by monitoring the camera to look for the user squinting, or other actions by the user such as turning their face away that indicate that the user eye response has not been comfortable for the current amount of brightness and time.

The system can also use a manual response where it receives a complaint from the user, such as the user saying "this color portion is too bright" at 270.

At 275, the system gets the darkness score and the color which caused the problem to the user, and saves this as part of the user's profile of darkness relationship at 280. This can be as simple as saving color 254 at brightness 11 was too bright for the user at darkness profile 3.

This data is adaptively formed into a curve that represents the user's likely light saturation sensitivity at different darkness profiles and saved as part of the personalized user darkness relationship.

Most or all of this happens in the background so as not to distract the driver. It is not safe for the driver to go into menus and settings to adjust the operation while driving.

An embodiment includes at least one light sensor that evaluates the light emanating from the entire screen. It uses initial factory settings or norms based on the company's research and development work, and also optimizes these initial settings.

The screen is divided into portions. These portions could be as large as quadrants or as minuscule as individual pixels. The software and computer in the vehicle continuously monitor this light level. The computer also uses data about the ambient lighting, how much sunlight for example is hitting the car. In this way, it can be connected or correlated to the automatic headlights of the car.

As information is updated and refreshed on the display screen, the computer in the vehicle looks for significant variations of light emanation. Returning to the working case described above, if a dark album cover is replaced by a light album cover for the next song, the system would adjust the brightness with the geometric perimeter or Cartesian coordinates of the refreshed content. So, the white album cover-displayed as a 5 by 6-inch rectangle on the screen could be dimmed without impacting the ambient areas. For example, the album cover could be dimmed by 30% due to its color and natural brightness while the adjacent temperature controls would remain at the higher brightness level for the driver's easy use.

This process can be dynamic and individual screen portions can be darkened or lightened based on the ambient light and other vehicle readings-including exterior illumination. For example, a vehicle traveling down Las Vegas Boulevard at 1 AM is in a much brighter environment than the same vehicle driving through Redwood National Forest at 1 AM.

It is also anticipated that this system would allow for user interaction and preferences. The driver could set their preferences while the vehicle is stationary. A few display scenarios could be presented, and the driver would simply select their preference. These preferences would be stored and quantified. So, if Driver A prefers less cockpit light, perhaps the system reduces the brightness of the white album cover by 50%. For other users, the reduction might only need to be 25%.

An embodiment also responds to real-time commands from the driver. For example, the driver could say "Hey BMW, can you reduce the brightness of the album cover?" When this occurred, the system would make the brightness adjustment and save this request so it could utilize Artificial Intelligence (AI) in an effort to improve driver satisfaction in the future without a prompt.

A goal of the invention is to increase driver comfort and to aid driver safety by improving the way that display screens in vehicles adjust and adapt to the conditions.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A vehicle display system for use in a vehicle that has an internal vehicle compartment, comprising:

a processor in the vehicle;

a vehicle screen, in the internal vehicle compartment, driven by the processor to display information on the vehicle screen;

a light sensor, in the internal vehicle compartment, sensing an amount of light in the compartment;

the processor receiving the amount of light from the light sensor, and storing a darkness score that depends on both the amount of light in the vehicle compartment and an amount of time that the light has been at a current level in the vehicle compartment;

the processor determining, if the darkness score indicates an amount of light less than a specified amount for an amount of time greater than a specified amount, a portion of a displayed information on the screen of the vehicle that has a first brightness and first color greater than a specified amount, and where there is another portion of the displayed information that has a second brightness and second color less than the specified amount;

the processor determining the portion of the displayed information which defines a brighter portion of the displayed information, and defining a perimeter of the portion of the displayed information which defines the brighter portion of the displayed information, and the processor operating to modify the portion of the displayed information inside the perimeter to reduce a color discomfort to a user for the portion of the displayed information inside the perimeter, and not modifying the displayed information outside the perimeter.

2. The system as in claim 1, wherein the portion of the displayed information inside the perimeter is modified to change the portion of the displayed information from displayed information in color to displayed information in greyscale.

3. The system as in claim 1, wherein the portion of the displayed information inside the perimeter is modified to reduce a saturation of color inside the portion of the displayed information.

4. The system as in claim 1, wherein the portion of the displayed information inside the perimeter is modified to reduce its brightness.

5. The system as in claim 1, further comprising obtaining a user profile for the user that defines a darkness relationship indicating a relationship between the dark score and brightness of the displayed information, and modifying the user profile based on actual user eye discomfort at certain dark scores and certain displayed information brightnesses and colors.

6. The system as in claim 5, wherein the actual user eye discomfort is determined by using a camera in the vehicle to monitor facial movements of the user and determine the user discomfort from the facial movements.

7. The system as in claim 6, wherein the user profile is initially a default user profile that is modified by detection of the actual user eye discomfort.

8. The system as in claim 5, wherein the light sensor is located at a location in the vehicle that receives a same direction of light as at least one of a user's eyes.

9. A method of displaying in a vehicle that has an internal vehicle compartment, comprising:

using a vehicle screen, in the internal vehicle compartment, and a processor in the vehicle to display information on the vehicle screen;

sensing an amount of light in the compartment;

receiving the amount of light, and storing a darkness score that depends on both the amount of light in the vehicle compartment and an amount of time that the light has been at a current level in the vehicle compartment;

determining, if the darkness score indicates an amount of light less than a specified amount for an amount of time greater than a specified amount, a portion of a displayed information on the screen of the vehicle that has a first brightness and first color greater than a specified amount, and where there is another portion of the displayed information that has a second brightness and second color less than the specified amount;

determining the portion of the displayed information which defines a brighter portion of the displayed information, and using a processor for defining a perimeter of the portion of the displayed information which defines the brighter portion of the displayed information, and modifying the portion of the displayed information inside the perimeter to reduce a color discomfort to a user for the portion of the displayed information inside the perimeter, and not modifying the displayed information outside the perimeter.

10. The method as in claim 9, wherein the portion of the displayed information inside the perimeter is modified to reduce to change the portion of the displayed information from displayed information in color to displayed information in greyscale.

11. The method as in claim 9, wherein the portion of the displayed information inside the perimeter is modified to reduce a saturation of color inside the portion of the displayed information.

12. The method as in claim 9, wherein the portion of the displayed information inside the perimeter is modified to reduce its brightness.

13. The method as in claim 9, further comprising obtaining a user profile for the user that defines a darkness relationship indicating a relationship between the dark score and brightness of the displayed information, and modifying the user profile based on actual user eye discomfort at certain dark scores and certain displayed information brightnesses and colors.

14. The method as in claim 13, wherein the actual user eye discomfort is determined by using a camera in the vehicle to monitor facial movements of the user and determine the user discomfort from the facial movements.

15. The method as in claim 14, wherein the user profile is initially a default user profile that is modified by detection of the actual user eye discomfort.

16. The method as in claim 13, wherein a light sensor is located at a location in the vehicle that receives a same direction of light as at least one of a user's eyes.

17. A vehicle display system for use in a vehicle that has an internal vehicle compartment, comprising:

a processor in the vehicle;

a vehicle screen, in the internal vehicle compartment, driven by the processor to display information on the vehicle screen;

a first light sensor, in the internal vehicle compartment, located at a first location where an amount of light that would enter a first of a user's eyes is sensed as a first eye light amount;

a second light sensor, in the internal vehicle compartment, located at a second location, different than the first location, and located where a second amount of light that would enter a second of the user's eyes is sensed as a second eye light amount;

the processor receiving the first eye light amount and the second eye light amount, and storing a darkness score that depends on all of the first eye light amount and the second eye light amount, and also an amount of time that the light amounts has been at a current level in the vehicle compartment;

the processor determining, if the darkness score indicates amounts of light less than a specified amount for amounts of time greater than a specified amount, a portion of a displayed information on the screen of the vehicle that has a first brightness and first color greater than a specified amount, and where there is another portion of the displayed information that has a second brightness and second color less than the specified amount;

the processor determining the portion of the displayed information which defines a brighter portion of the displayed information, and defining a perimeter of portion of the displayed information which defines the brighter portion of the displayed information, and the processor operating to modify the portion of the displayed information inside the perimeter to reduce a color discomfort to the user for the portion of the displayed information inside the perimeter, and not modifying the displayed information outside the perimeter.

18. The system as in claim 17, further comprising obtaining a user profile for the user that defines a darkness relationship indicating a relationship between the dark score and brightness of the displayed information, and modifying the user profile based on actual user eye discomfort at certain dark scores and certain displayed information brightnesses and colors.

19. The system as in claim 18, wherein the actual user eye discomfort is determined by using a camera in the vehicle to monitor facial movements of the user and determine the user discomfort from the facial movements.

* * * * *